UNITED STATES PATENT OFFICE.

MORGAN K. ARMSTRONG, OF WINNETKA, ILLINOIS, ASSIGNOR TO BESTWALL MANUFACTURING COMPANY, OF CHICAGO, ILLINOIS, A CORPORATION OF DELAWARE.

PLASTIC COMPOSITION.

1,384,037.     Specification of Letters Patent.     Patented July 12, 1921.

No Drawing.     Application filed October 1, 1919. Serial No. 327,625.

*To all whom it may concern:*

Be it known that I, MORGAN K. ARMSTRONG, a citizen of the United States, and a resident of Winnetka, in the county of Cook and State of Illinois, have invented certain new and useful Improvements in Plastic Composition; and I do hereby declare that the following is a full and exact description thereof.

This invention relates to improvements in plaster composition and consists of the matters hereinafter described and more particularly pointed out in the appended claim.

The object of the invention is to produce a plaster composition, more particularly adapted for making plaster board, plaster blocks, and the like, which will be economical as to cost, which will be of superior strength when hardened, and which will be light in weight, in comparison with other plaster compositions now used for like purposes.

My improved composition consists of a mixture of gypsum or stucco, plaster of Paris or like material and of peat, or peat moss or sphagnum which has been reduced by maceration or otherwise to a finely divided fibrous condition.

In preparing the composition, the ingredients are preferably used in the proportion of fifteen pounds of peat or peat moss, or sphagnum, to eighty-five pounds of calcined gypsum, stucco or other plaster material. The peat, or peat moss, or sphagnum and gypsum or the like are thoroughly mixed and to each one hundred pounds of the mixture there is added sufficient water to make the mixture workable. This provides the water required for the crystallization of the gypsum when the plaster mixture is hardening or "setting."

In the manufacture of plaster board, the plaster composition may be made as it is required, the mixture of peat or peat moss and gypsum being made in a hopper or other container from which it is thrown on a moving belt whereon the water is introduced and stirred into the mixture.

Peat, or peat moss, has a considerable percentage of vegetable colloidal matter in its composition. This is of substantial advantage to the plaster mixture containing peat or peat moss as a component, since the colloidal matter acts as a retarder in the "setting" of the mixture, thus rendering unnecessary the addition of such substances as dextrin or the like as heretofore used in other plaster mixtures.

In preparing the peat moss for use, it is preferably washed thoroughly so as to remove all foreign matter, leaving only the substantially clean, fibrous moss proper.

My improved composition is light in weight, is fireproof, and is an efficient non-conductor of heat. It adheres to the surfaces to which it is applied, as for example to the surfaces of the paper or the fibrous sheets used in making plaster board and meets all the conditions requisite in the filler of such board. The fibrous condition of the peat moss greatly increases the tensile strength of the board, blocks, or other plaster forms for which it is used.

I claim as my invention:

A plaster composition comprising approximately eighty-five pounds of calcined gypsum, mixed dry with approximately fifteen pounds of finely divided peat or peat moss, the combined one hundred pounds of dry mixture being mixed with water in sufficient amount to make it workable.

In testimony that I claim the foregoing as my invention, I affix my signature in the presence of two witnesses, this 29th day of September, A. D. 1919.

MORGAN K. ARMSTRONG.

Witnesses:
    EDITH A. BREEVE,
    T. H. ALFREDS.